(12) United States Patent
Sullivan

(10) Patent No.: US 6,210,293 B1
(45) Date of Patent: Apr. 3, 2001

(54) MULTI-LAYER GOLF BALL

(75) Inventor: Michael J. Sullivan, Chicopee, MA (US)

(73) Assignee: Spalding Sports Worldwide, Inc., Chicopee, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/470,196

(22) Filed: Dec. 21, 1999

Related U.S. Application Data

(63) Continuation of application No. 08/870,585, filed on Jun. 6, 1997, which is a continuation of application No. 08/556,237, filed on Nov. 9, 1995, now abandoned, which is a continuation-in-part of application No. 08/070,510, filed on Jun. 1, 1993, now abandoned.

(51) Int. Cl.$^7$ .................................................... A63B 37/12
(52) U.S. Cl. ............................................................ 473/374
(58) Field of Search ...................................... 473/370–378

(56) References Cited

U.S. PATENT DOCUMENTS

| | | | | |
|---|---|---|---|---|
| 4,431,193 | * | 2/1984 | Nesbitt | 473/374 |
| 5,068,151 | * | 11/1991 | Nakamura | 473/377 |
| 5,314,187 | * | 5/1994 | Proudfit | 473/374 |

* cited by examiner

Primary Examiner—Mark S. Graham

(57) ABSTRACT

The present invention is directed to an improved multi-layer golf ball comprising a core, an inner cover layer and an outer cover layer. The inner cover layer is comprised of a low acid ionomer blend which may or may not include a filler such as zinc-stearate. The outer cover layer is comprised of a soft, non-ionomeric thermoplastic or thermosetting elastomer such as polyurethane, polyester or polyesteramide. The resulting multi-layered golf ball of the present invention provides for enhanced distance without sacrificing playability or durability when compared to known multi-layer golf balls.

8 Claims, 1 Drawing Sheet

MULTI-LAYER GOLF BALL

This application is a continuation application of U.S. application Ser. No. 08/870,585 filed Jun. 6, 1997, pending, which is a continuation application of U.S. application Ser. No. 08/556,237 filed on Nov. 9, 1995, now abandoned, which is a continuation-in-part of U.S. application Ser. No. 08/070,510 filed Jun. 1, 1993, abandoned.

FIELD OF THE INVENTION

The present invention relates to golf balls and, more particularly, to improved standard and oversized golf balls comprising multi-layer covers which have a comparatively hard inner layer and a relatively soft outer layer such as that produced by the use of a polyurethane based outer layer. The improved multi-layer golf balls provide for enhanced distance and durability properties over single layer cover golf balls while at the same time offering enhanced "feel" and spin characteristics generally associated with soft balata and balata-like covers of the prior art.

BACKGROUND OF THE INVENTION

Traditional golf ball covers have been comprised of balata or blends of balata with elastomeric or plastic materials. The traditional balata covers are relatively soft and flexible. Upon impact, the soft balata covers compress against the surface of the club producing high spin. Consequently, the soft and flexible balata covers provide an experienced golfer with the ability to apply a spin to control the ball in flight in order to produce a draw or a fade, or a backspin which causes the ball to "bite" or stop abruptly on contact with the green. Moreover, the soft balata covers produce a soft "feel" to the low handicap player. Such playability properties (workability, feel, etc.) are particularly important in short iron play with low swing speeds and are exploited significantly by relatively skilled players.

Despite all the benefits of balata, balata covered golf balls are easily cut and/or damaged if mis-hit. Golf balls produced with balata or balata-containing cover compositions therefore have a relatively short lifespan.

As a result of this negative property, balata and its synthetic substitutes, transpolyisoprene and transpolybutadiene, have been essentially replaced as the cover materials of choice by new cover materials comprising ionomeric resins.

Ionomeric resins are polymers containing interchain ionic bonding. As a result of their toughness, durability and flight characteristics, various ionomeric resins sold by E. I. DuPont de Nemours & Company under the trademark "Surlyn®" and more recently, by the Exxon Corporation (see U.S. Pat. No. 4,911,451) under the trademarks "Escor®" and the trade name "Iotek", have become the materials of choice for the construction of golf ball covers over the traditional "balata" (transpolyisoprene, natural or synthetic) rubbers. As stated, the softer balata covers, although exhibiting enhanced playability properties, lack the durability (cut and abrasion resistance, fatigue endurance, etc.) properties required for repetitive play.

Ionomeric resins are generally ionic copolymers of an olefin, such as ethylene, and a metal salt of an unsaturated carboxylic acid, such as acrylic acid, methacrylic acid, or maleic acid. Metal ions, such as sodium or zinc, are used to neutralize some portion of the acidic group in the copolymer resulting in a thermoplastic elastomer exhibiting enhanced properties, i.e. durability, etc., for golf ball cover construction over balata. However, some of the advantages gained in increased durability have been offset to some degree by the decreases produced in playability. This is because although the ionomeric resins are very durable, they tend to be very hard when utilized for golf ball cover construction, and thus lack the degree of softness required to impart the spin necessary to control the ball in flight. Since the ionomeric resins are harder than balata, the ionomeric resin covers do not compress as much against the face of the club upon impact, thereby producing less spin. In addition, the harder and more durable ionomeric resins lack the "feel" characteristic associated with the softer balata related covers.

As a result, while there are currently more than fifty (50) commercial grades of ionomers available both from DuPont and Exxon, with a wide range of properties which vary according to the type and amount of metal cations, molecular weight, composition of the base resin (i.e., relative content of ethylene and methacrylic and/or acrylic acid groups) and additive ingredients such as reinforcement agents, etc., a great deal of research continues in order to develop a golf ball cover composition exhibiting not only the improved impact resistance and carrying distance properties produced by the "hard" ionomeric resins, but also the playability (i.e., "spin", "feel", etc.) characteristics previously associated with the "soft" balata covers, properties which are still desired by the more skilled golfer.

Consequently, a number of two-piece (a solid resilient center or core with a molded cover) and three-piece (a liquid or solid center, elastomeric winding about the center, and a molded cover) golf balls have been produced by the present inventor and others to address these needs. The different types of materials utilized to formulate the cores, covers, etc. of these balls dramatically alters the balls' overall characteristics.

In addition, multi-layered covers containing one or more ionomer resins have also been formulated in an attempt to produce a golf ball having the overall distance, playability and durability characteristics desired. For example, this was addressed by Spalding & Evenflo Companies, Inc., the assignee of the present invention, in U.S. Pat. No. 4,431,193 where a multi-layered regular sized, golf ball is disclosed.

In the '193 patent, a multi-layer golf ball is produced by initially molding a first cover layer on a spherical core and then adding a second layer. The first layer is comprised of a hard, high flexural modulus resinous material such as type 1605 Surlyn® (now designated Surlyn® 8940). Type 1605 Surlyn® (Surlyn® 8940) is a sodium ion based low acid (less than or equal to 15 weight percent methacrylic acid) ionomer resin having a flexural modulus of about 51,000 psi. An outer layer of a comparatively soft, low flexural modulus resinous material such as type 1855 Surlyn® (now designated Surlyn® 9020) is molded over the inner cover layer. Type 1855 Surlyn® (Surlyn® 9020) is a zinc ion based low acid (10 weight percent methacrylic acid) ionomer resin having a flexural modulus of about 14,000 psi.

The '193 patent teaches that the hard, high flexural modulus resin which comprises the first layer provides for a gain in coefficient of restitution over the coefficient of restitution of the core. The increase in the coefficient of restitution provides a ball which serves to attain or approach the maximum initial velocity limit of 255 feet per second as provided by the United States Golf Association (U.S.G.A.) rules. The relatively soft, low flexural modulus outer layer provides essentially no gain in the coefficient of restitution but provides for the advantageous "feel" and playing characteristics of a balata covered golf ball.

Unfortunately, however, while a ball of the '193 patent does exhibit enhanced playability characteristics with improved distance (i.e. enhanced C.O.R. values) over a number of other then known multi-layered balls, the ball suffers from poor cut resistance and relatively short distance (i.e. lower C.O.R. values) when compared to two-piece, single cover layer balls commercially available today. These undesirable properties make the ball produced in accordance with the '193 patent unacceptable by today's standards.

The present invention is directed to new multi-layer golf ball compositions which provide for enhanced coefficient of restitution (i.e, enhanced resilience or carrying distance) and/or durability properties when compared to the multi-layer balls found in the prior art, as well as improved outer cover layer softness and durability. As such, the playability characteristics (i.e., "feel", "click", "spin", etc.) are not diminished.

These and other objects and features of the invention will be apparent from the following summary and description of the invention, the drawings and from the claims.

SUMMARY OF THE INVENTION

The present invention is directed to improved multi-layer golf ball cover compositions and the resulting multi-layer golf balls produced using the improved compositions. The novel multi-layer golf ball covers of the present invention include a first or inner layer or ply of a high acid (greater than 16 weight percent acid) ionomer blend or, more preferably, a low acid (16 weight percent acid or less) ionomer blend and second or outer layer or ply comprised of a comparatively softer, low modulus ionomer, ionomer blend or other non-ionomeric thermoplastic or thermosetting elastomer such as polyurethane or polyester elastomer. The multi-layer golf balls of the invention can be of standard or enlarged size. Preferably, the inner layer or ply incudes a blend of low acid ionomers and has a Shore D hardness of 60 or greater and the outer cover layer comprised of polyurethane and has a Shore D hardness of about 45 (i.e., Shore C hardness of about 65).

It has been found that multi-layer golf balls having inner and outer cover layers exhibit higher C.O.R. values and have greater travel distance in comparison with balls made from a single cover layer. In addition, it has been found that use of a inner cover layer constructed of a blend of low acid (i.e., 16 weight percent acid or less) ionomer resins produces softer compression and higher spin rates than inner cover layers constructed of high acid ionomer resins. This is compounded by the fact that the softer polyurethane outer layer adds to the desirable "feel" and high spin rate while maintaining respectable resiliency. The soft outer layer allows the cover to deform more during impact and increases the area of contact between the club face and the cover, thereby imparting more spin on the ball. As a result, the soft polyurethane cover provides the ball with a balata-like feel and playability characteristics with improved distance and durability.

Consequently, the overall combination of inner and outer cover layers made from blends of low acid ionomer resins and polyurethane results in a standard size or oversized golf ball having enhanced resilience (improved travel distance) and durability (i.e. cut resistance, etc.) characteristics while maintaining and in many instances, improving the balls playability properties.

The combination of a low acid ionomer blend inner cover layer with a soft, relatively low modulus ionomer, polyurethane based elastomer outer cover layer provides for good overall coefficient of restitution (i.e., enhanced resilience) while at the same time demonstrating improved compression and spin. The outer cover layer generally contributes to a more desirable feel and spin, particularly at lower swing speeds with highly lofted clubs such as half wedge shots.

Two principal properties involved in golf ball performance are resilience and hardness. Resilience is determined by the coefficient of restitution (C.O.R.), the constant "e" which is the ratio of the relative velocity of two elastic spheres after direct impact to that before impact. As a result, the coefficient of restitution ("e") can vary from 0 to 1, with 1 being equivalent to an elastic collision and 0 being equivalent to an inelastic collision.

Resilience (C.O.R.), along with additional factors such as club head speed, angle of trajectory and ball configuration (i.e., dimple pattern) generally determine the distance a ball will travel when hit. Since club head speed and the angle of trajectory are factors not easily controllable by a manufacturer, factors of concern among manufacturers are the coefficient of restitution (C.O.R.) and the surface configuration of the ball.

The coefficient of restitution (C.O.R.) in solid core balls is a function of the composition of the molded core and of the cover. In balls containing a wound core (i.e., balls comprising a liquid or solid center, elastic windings, and a cover), the coefficient of restitution is a function of not only the composition of the center and cover, but also the composition and tension of the elastomeric windings. Although both the core and the cover contribute to the coefficient of restitution, the present invention is directed to the enhanced coefficient of restitution (and thus travel distance) which is affected by the cover components.

In this regard, the coefficient of restitution of a golf ball is generally measured by propelling a ball at a given speed against a hard surface and measuring the ball's incoming and outgoing velocity electronically. As mentioned above, the coefficient of restitution is the ratio of the outgoing velocity to the incoming velocity. The coefficient of restitution must be carefully controlled in all commercial golf balls in order for the ball to be within the specifications regulated by the United States Golf Association (U.S.G.A.). Along this line, the U.S.G.A. standards indicate that a "regulation" ball cannot have an initial velocity (i.e., the speed off the club) exceeding 255 feet per second. Since the coefficient of restitution of a ball is related to the ball's initial velocity, it is highly desirable to produce a ball having sufficiently high coefficient of restitution to closely approach the U.S.G.A. limit on initial velocity, while having an ample degree of softness (i.e., hardness) to produce enhanced playability (i.e., spin, etc.).

The hardness of the ball is the second principal property involved in the performance of a golf ball. The hardness of the ball can affect the playability of the ball on striking and the sound or "click" produced. Hardness is determined by the deformation (i.e., compression) of the ball under various load conditions applied across the ball's diameter (i.e., the lower the compression value, the harder the material). As indicated in U.S. Pat. No. 4,674,751, softer covers permit the accomplished golfer to impart proper spin. This is because the softer covers deform on impact significantly more than balls having "harder" ionomeric resin covers. As a result, the better player is allowed to impart fade, draw or backspin to the ball thereby enhancing playability. Such properties may be determined by various spin rate tests such as the "nine iron" spin rate test described below in the Examples.

Accordingly, the present invention is directed to an improved multi-layer cover which produces, upon molding each layer around a core (preferably a solid core) to formulate a multi-layer cover, a golf ball exhibiting enhanced distance (i.e., resilience) without adversely affecting, and in many instances, improving the ball's playability (hardness/softness) and/or durability (i.e., cut resistance, fatigue resistance, etc.) characteristics.

These and other objects and features of the invention will be apparent from the following detailed description.

DETAILED DESCRIPTION OF THE INVENTION

Figure 1:
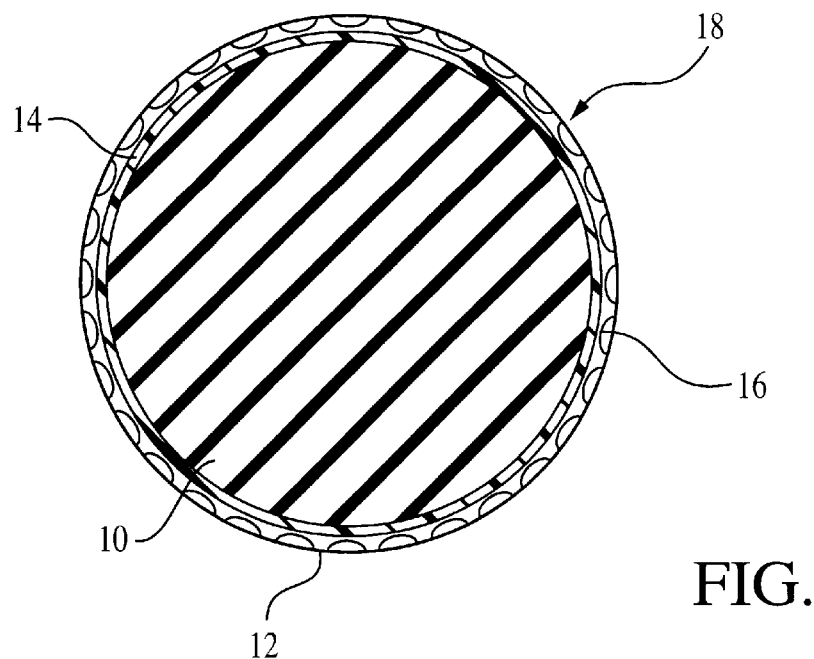
FIG. 1 is a cross-sectional view of a golf ball embodying the invention illustrating a core 10 and a cover 12 consisting of an inner layer 14 and an outer layer 16 having dimples 18.
Figure 2:
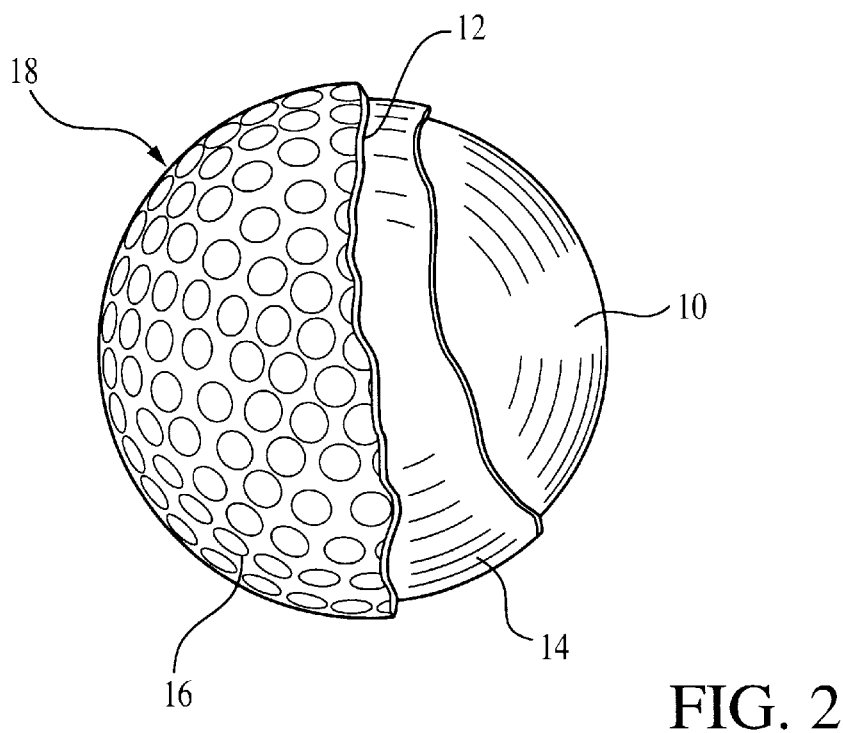
FIG. 2 is a diametrical cross-sectional view of a golf ball of the invention having a core 10 and a cover 12 made of an inner layer 14 and an outer layer 16 having dimple 18.

The present invention relates to improved multi-layer golf balls, particularly a golf ball comprising a multi-layered cover 12 over a solid core 10, and method for making same.

The multi-layered cover 12 comprises two layers: a first or inner layer or ply 14 and a second or outer layer or ply 16. The inner layer 14 is comprised of a low acid (i.e. 16 weight percent acid or less) ionomer blend. Preferably, the inner layer is comprised of a blend of two or more low acid (i.e. 16 weight percent acid or less) ionomer resins neutralized to various extents by different metal cations. The inner cover layer may or may not include a metal stearate (e.g., zinc stearate) or other metal fatty acid salt. The purpose of the metal stearate or other metal fatty acid salt is to lower the cost of production without affecting the overall performance of the finished golf ball.

The low acid ionomers which may be suitable for use in formulating the inner layer compositions of the subject invention are ionic copolymers which are the metal, i.e., sodium, zinc, magnesium, etc., salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (i.e., iso- or n-butylacrylate, etc.) can also be included to produce a softer terpolymer. The carboxylic acid groups of the copolymer are partially neutralized (i.e., approximately 10–75%, preferably 30–70%) by the metal ions. Each of the low acid ionomer resins which may be included in the inner layer cover compositions of the invention contains 16% by weight or less of a carboxylic acid.

The inner layer compositions include the low acid ionomers such as those developed and sold by E. I. DuPont de Nemours & Company under the trademark "Surlyn®" and by Exxon Corporation under the trademark "Escor®" or tradename "Iotek", or blends thereof.

The low acid ionomeric resins available from Exxon under the designation "Escor®" and or "Iotek", are somewhat similar to the low acid ionomeric resins available under the "Surlyn®" trademark. However, since the Escor®/Iotek ionomeric resins are sodium or zinc salts of poly(ethylene-acrylic acid) and the "Surlyn®" resins are zinc, sodium, magnesium, etc. salts of poly(ethylene-methacrylic acid), distinct differences in properties exist.

When utilized in the construction of the inner layer of a multi-layered golf ball, it has been found that the low acid ionomer blends extend the range of compression and spin rates beyond that previously obtainable. More preferably, it has been found that when two or more low acid ionomers, particularly blends of sodium and zinc high acid ionomers, are processed to produce the covers of multi-layered golf balls, (i.e., the inner cover layer herein) the resulting golf balls will travel further and at an enhanced spin rate than previously known multi-layered golf balls. Such an improvement is particularly noticeable in enlarged or over-sized golf balls.

For example, the normal size, multi-layer golf ball taught in U.S. Pat. No. 4,650,193 does not incorporate blends of low acid ionomeric resins of the present invention in the inner cover layer. In addition, the multi-layered ball disclosed in the '193 patent suffers substantially in durability in comparison with the present invention.

Furthermore, as shown in the Examples, use of a inner layer formulated from blends of lower acid ionomers produces multi-layer golf balls having enhanced compression and spin rates. These are the properties desired by the more skilled golfer.

With respect to the outer layer 16 of the multi-layered cover of the present invention, the outer cover layer is comparatively softer than the low acid ionomer blend based inner layer. The softness provides for the enhanced feel and playability characteristics typically associated with balata or balata-blend balls. The outer layer or ply is comprised of a relatively soft, low modulus (about 1,000 psi to about 10,000 psi) and low acid (less than 16 weight percent acid) ionomer, ionomer blend or a non-ionomeric elastomer such as, but not limited to, a polyurethane, a polyester elastomer such as that marketed by DuPont under the trademark Hytrel®, a polyurethane sold by BASF under the designation Baytec® or a polyester amide such as that marketed by Elf Atochem S.A. under the trademark Pebax®. The outer layer is fairly thin (i.e. from about 0.010 to about 0.070 in thickness, more desirably 0.03 to 0.06 inches in thickness for a 1.680 inch ball and 0.04 to 0.07 inches in thickness for a 1.72 inch ball), but thick enough to achieve desired playability characteristics while minimizing expense.

Preferably, the outer layer includes a blend of hard and soft (low acid) ionomer resins such as those described in U.S. Pat. Nos. 4,884,814 and 5,120,791, both incorporated herein by reference. Specifically, a desirable material for use in molding the outer layer comprises a blend of a high modulus (hard), low acid, ionomer with a low modulus (soft), low acid, ionomer to form a base ionomer mixture. A high modulus ionomer herein is one which measures from about 15,000 to about 70,000 psi as measured in accordance with ASTM method D-790. The hardness may be defined as at least 50 on the Shore D scale as measured in accordance with ASTM method D-2240.

A low modulus ionomer suitable for use in the outer layer blend has a flexural modulus measuring from about 1,000 to about 10,000 psi, with a hardness of about 20 to about 40 on the Shore D scale.

The hard ionomer resins utilized to produce the outer cover layer composition hard/soft blends include ionic copolymers which are the sodium, zinc, magnesium or lithium salts of the reaction product of an olefin having from 2 to 8 carbon atoms and an unsaturated monocarboxylic acid having from 3 to 8 carbon atoms. The carboxylic acid groups of the copolymer may be totally or partially (i.e. approximately 15–75 percent) neutralized.

The hard ionomeric resins are likely copolymers of ethylene and either acrylic and/or methacrylic acid, with copolymers of ethylene and acrylic acid being the most preferred. Two or more types of hard ionomeric resins may be blended into the outer cover layer compositions in order to produce the desired properties of the resulting golf balls.

As discussed earlier herein, the hard ionomeric resins introduced under the designation Escor® and sold under the designation "Iotek" are somewhat similar to the hard ionomeric resins sold under the Surlyn® trademark. However, since the "Iotek" ionomeric resins are sodium or zinc salts of poly(ethylene-acrylic acid) and the Surlyn® resins are zinc or sodium salts of poly(ethylene-methacrylic acid) some distinct differences in properties exist. As more specifically indicated in the data set forth below, the hard "Iotek" resins (i.e., the acrylic acid based hard ionomer resins) are the more preferred hard resins for use in formulating the outer layer blends for use in the present invention. In addition, various blends of "Iotek" and Surlyn® hard ionomeric resins, as well as other available ionomeric resins, may be utilized in the present invention in a similar manner.

Examples of commercially available hard ionomeric resins which may be used in the present invention in formulating the inner and outer cover blends include the hard sodium ionic copolymer sold under the trademark Surlyn®8940 and the hard zinc ionic copolymer sold under the trademark Surlyn®9910. Surlyn®8940 is a copolymer of ethylene with methacrylic acid and about 15 weight percent acid which is about 29 percent neutralized with sodium ions. This resin has an average melt flow index of about 2.8. Surlyn®9910 is a copolymer of ethylene and methacrylic acid with about 15 weight percent acid which is about 58 percent neutralized with zinc ions. The average melt flow index of Surlyn®9910 is about 0.7. The typical properties of Surlyn®9910 and 8940 are set forth below in Table 1:

TABLE 1

Typical Properties of Commercially Available Hard Surlyn ® Resins Suitable for Use in the Inner and Outer Layer Blends of the Present Invention

|  | ASTM D | 8940 | 9910 | 8920 | 8528 | 9970 | 9730 |
| --- | --- | --- | --- | --- | --- | --- | --- |
| Cation Type |  | Sodium | Zinc | Sodium | Sodium | Zinc | Zinc |
| Melt flow index, gms/10 min. | D-1238 | 2.8 | 0.7 | 0.9 | 1.3 | 14.0 | 1.6 |
| Specific Gravity, g/cm$^3$ | D-792 | 0.95 | 0.97 | 0.95 | 0.94 | 0.95 | 0.95 |
| Hardness, Shore D | D-2240 | 66 | 44 | 66 | 60 | 62 | 63 |
| Tensile Strength, (kpsi), MPa | D-638 | (4.8) 33.1 | (3.6) 24.8 | (5.4) 37.2 | (4.2) 29.0 | (3.2) 22.0 | (4.1) 28.0 |
| Elongation, % | D-638 | 470 | 290 | 350 | 450 | 460 | 460 |
| Flexural Modulus, (kpsi) MPa | D-790 | (51) 350 | (48) 330 | (55) 380 | (32) 220 | (28) 190 | (30) 210 |
| Tensile Impact (23° C.) KJ/m$_2$ (ft.-lbs./in$^2$) | D-1822S | 1020 (485) | 1020 (485) | 865 (410) | 1160 (550) | 760 (360) | 1240 (590) |
| Vicat Temperature, ° C. | D-1525 | 63 | 62 | 58 | 73 | 61 | 73 |

Examples of the more pertinent acrylic acid based hard ionomer resin suitable for use in the present inner and outer cover composition sold under the "Iotek" tradename by the Exxon Corporation include Iotek 4000, Iotek 4010, Iotek 8000, Iotek 8020 and Iotek 8030. The typical properties of these and other Iotek hard ionomers suited for use in formulating the inner and outer layer cover compositions are set forth below in Table 2:

TABLE 2

Typical Properties of Iotek Ionomers

| | ASTM Method | Units | 4000 | 4010 | 8000 | 8020 | 8030 |
|---|---|---|---|---|---|---|---|
| Resin Properties | | | | | | | |
| Cation type | | | zinc | zinc | sodium | sodium | sodium |
| Melt index | D-1238 | g/10 min. | 2.5 | 1.5 | 0.8 | 1.6 | 2.8 |
| Density | D-1505 | kg/m$^3$ | 963 | 963 | 954 | 960 | 960 |
| Melting Point | D-3417 | °C. | 90 | 90 | 90 | 87.5 | 87.5 |
| Crystallization Point | D-3417 | °C. | 62 | 64 | 56 | 53 | 55 |
| Vicat Softening Point | D-1525 | °C. | 62 | 63 | 61 | 64 | 67 |
| % Weight Acrylic Acid | | | 16 | | 11 | | |
| % of Acid Groups cation neutralized | | | 30 | | 40 | | |
| Plaque Properties (3 mm thick, compression molded) | | | | | | | |
| Tensile at break | D-638 | MPa | 24 | 26 | 36 | 31.5 | 28 |
| Yield point | D-638 | MPa | none | none | 21 | 21 | 23 |
| Elongation at break | D-638 | % | 395 | 420 | 350 | 410 | 395 |
| 1% Secant modulus | D-638 | MPa | 160 | 160 | 300 | 350 | 390 |
| Shore Hardness D | D-2240 | — | 55 | 55 | 61 | 58 | 59 |
| Film Properties (50 micron film 2.2:1 Blow-up ratio) | | | | | | | |
| Tensile at Break | | | | | | | |
| MD | D-882 | MPa | 41 | 39 | 42 | 52 | 47.4 |
| TD | D-882 | MPa | 37 | 38 | 38 | 38 | 40.5 |
| Yield point | | | | | | | |
| MD | D-882 | MPa | 15 | 17 | 17 | 23 | 21.6 |
| TD | D-882 | MPa | 14 | 15 | 15 | 21 | 20.7 |
| Elongation at Break | | | | | | | |
| MD | D-882 | % | 310 | 270 | 260 | 295 | 305 |
| TD | D-882 | % | 360 | 340 | 280 | 340 | 345 |
| 1% Secant modulus | | | | | | | |
| MD | D-882 | MPa | 210 | 215 | 390 | 380 | 380 |
| TD | D-882 | MPa | 200 | 225 | 380 | 350 | 345 |
| Dart Drop Impact | D-1709 | g/micron | 12.4 | 12.5 | 20.3 | | |

| | ASTM Method | Units | 7010 | 7020 | 7030 |
|---|---|---|---|---|---|
| Resin Properties | | | | | |
| Cation type | | | zinc | zinc | zinc |
| Melt Index | D-1238 | g/10 min. | 0.8 | 1.5 | 2.5 |
| Density | D-1505 | kg/m$^3$ | 960 | 960 | 960 |
| Melting Point | D-3417 | °C. | 90 | 90 | 90 |
| Crystallization Point | D-3417 | °C. | — | — | — |
| Vicat Softening Point | D-1525 | °C. | 60 | 63 | 62.5 |
| % Weight Acrylic Acid | | | — | — | — |
| % of Acid Groups Cation Neutralized | | | — | — | — |
| Plaque Properties (3 mm thick, compression molded) | | | | | |
| Tensile at break | D-638 | MPa | 38 | 38 | 38 |
| Yield Point | D-638 | MPa | none | none | none |
| Elongation at break | D-638 | % | 500 | 420 | 395 |
| 1% Secant modulus | D-638 | MPa | — | — | — |
| Shore Hardness D | D-2240 | — | 57 | 55 | 55 |

Comparatively, soft ionomers are used in formulating the hard/soft blends of the inner and outer cover compositions. These ionomers include acrylic acid based soft ionomers. They are generally characterized as comprising sodium or zinc salts of a terpolymer of an olefin having from about 2 to 8 carbon atoms, acrylic acid, and an unsaturated monomer of the acrylate ester class having from 1 to 21 carbon atoms. The soft ionomer is preferably a zinc based ionomer made from an acrylic acid base polymer in an unsaturated monomer of the acrylate ester class. The soft (low modulus) ionomers have a hardness from about 20 to about 40 as measured on the Shore D scale and a flexural modulus from about 1,000 to about 10,000, as measured in accordance with ASTM method D-790.

Certain ethylene-acrylic acid based soft ionomer resins developed by the Exxon Corporation under the designation "Iotek 7520" (referred to experimentally by differences in neutralization and melt indexes as LDX 195, LDX 196, LDX 218 and LDX 219) may be combined with known hard ionomers such as those indicated above to produce the inner and outer cover layers. The combination produces higher C.O.R.s at equal or softer hardness, higher melt flow (which corresponds to improved, more efficient molding, i.e., fewer rejects) as well as significant cost savings versus the inner and outer layers of multi-layer balls produced by other known hard-soft ionomer blends as a result of the lower overall raw materials costs and improved yields.

While the exact chemical composition of the resins to be sold by Exxon under the designation Iotek 7520 is considered by Exxon to be confidential and proprietary information, Exxon's experimental product data sheet lists the following physical properties of the ethylene acrylic acid zinc ionomer developed by Exxon:

TABLE 3

Physical Properties of Iotek 7520

| Property | ASTM Method | Units | Typical Value |
| --- | --- | --- | --- |
| Melt Index | D-1238 | g/10 min. | 2 |
| Density | D-1505 | kg/m$^3$ | 0.962 |
| Cation | | | Zinc |
| Melting Point | D-3417 | °C. | 66 |
| Crystallization Point | D-3417 | °C. | 49 |
| Vicat Softening Point | D-1525 | °C. | 42 |
| Plaque Properties (2 mm thick Compression Molded Plaques) | | | |
| Tensile at Break | D-638 | MPa | 10 |
| Yield Point | D-638 | MPa | None |
| Elongation at Break | D-638 | % | 760 |
| 1% Secant Modulus | D-638 | MPa | 22 |
| Shore D Hardness | D-2240 | | 32 |
| Flexural Modulus | D-790 | MPa | 26 |
| Zwick Rebond | ISO 4862 | % | 52 |
| De Mattia Flex Resistance | D-430 | Cycles | >5000 |

In addition, test data collected by the inventor indicates that Iotek 7520 resins have Shore D hardnesses of about 32 to 36 (per ASTM D-2240), melt flow indexes of 3±0.5 g/10 min (at 190° C. per ASTM D-1288), and a flexural modulus of about 2500–3500 psi (per ASTM D-790). Furthermore, testing by an independent testing laboratory by pyrolysis mass spectrometry indicates that Iotek 7520 resins are generally zinc salts of a terpolymer of ethylene, acrylic acid, and methyl acrylate.

Furthermore, the inventor has found that a newly developed grade of an acrylic acid based soft ionomer available from the Exxon Corporation under the designation Iotek 7510, is also effective, when combined with the hard ionomers indicated above in producing golf ball covers exhibiting higher C.O.R. values at equal or softer hardness than those produced by known hard-soft ionomer blends. In this regard, Iotek 7510 has the advantages (i.e. improved flow, higher C.O.R. values at equal hardness, increased clarity, etc.) produced by the Iotek 7520 resin when compared to the methacrylic acid base soft ionomers known in the art (such as the Surlyn 8625 and the Surlyn 8629 combinations disclosed in U.S. Pat. No. 4,884,814).

In addition, Iotek 7510, when compared to Iotek 7520, produces slightly higher C.O.R. valves at equal softness/hardness due to the Iotek 7510's higher hardness and neutralization. Similarly, Iotek 7510 produces better release properties (from the mold cavities) due to its slightly higher stiffness and lower flow rate than Iotek 7520. This is important in production where the soft covered balls tend to have lower yields caused by sticking in the molds and subsequent punched pin marks from the knockouts.

According to Exxon, Iotek 7510 is of similar chemical composition as Iotek 7520 (i.e. a zinc salt of a terpolymer of ethylene, acrylic acid, and methyl acrylate) but is more highly neutralized. Based upon FTIR analysis, Iotek 7520 is estimated to be about 30–40 wt.-% neutralized and Iotek 7510 is estimated to be about 40–60 wt.-% neutralized. The typical properties of Iotek 7510 in comparison of those of Iotek 7520 are set forth below:

TABLE 4

Physical Properties of Iotek 7510 in Comparison to Iotek 7520

| | IOTEK 7520 | IOTEK 7510 |
| --- | --- | --- |
| MI, g/10 min | 2.0 | 0.8 |
| Density, g/cc | 0.96 | 0.97 |
| Melting Point, °F. | 151 | 149 |
| Vicat Softening Point, °F. | 108 | 109 |
| Flex Modulus, psi | 3800 | 5300 |
| Tensile Strength, psi | 1450 | 1750 |
| Elongation, % | 760 | 690 |
| Hardness, Shore D | 32 | 35 |

It has been determined that when hard/soft ionomer blends are used for the outer cover layer, good results are achieved when the relative combination is in a range of about 90 to about 10 percent hard ionomer and about 10 to about 90 percent soft ionomer. The results are improved by adjusting the range to about 75 to 25 percent hard ionomer and 25 to 75 percent soft ionomer. Even better results are noted at relative ranges of about 60 to 90 percent hard ionomer resin and about 40 to 60 percent soft ionomer resin.

Specific formulations which may be used in the cover composition are included in the examples set forth in U.S. Pat. Nos. 5,120,791 and 4,884,814. The present invention is in no way limited to those examples.

Moreover, in alternative embodiments, the outer cover layer formulation may also comprise a soft, low modulus non-ionomeric thermoplastic elastomer including a polyester polyurethane such as B.F.Goodrich Company's Estane® polyester polyurethane X-4517. According to B.F.Goodrich, Estane® X-4517 has the following properties:

| Properties of Estane ® X-4517 | |
| --- | --- |
| Tensile | 1430 |
| 100% | 815 |
| 200% | 1024 |
| 300% | 1193 |
| Elongation | 641 |
| Youngs Modulus | 1826 |
| Hardness A/D | 88/39 |
| Dayshore Rebound | 59 |
| Solubility in Water | Insoluble |
| Melt processing temperature | >350° F. (>177° C.) |
| Specific Gravity ($H_2O$ = 1) | 1.1–1.3 |

Other soft, relatively low modulus non-ionomeric thermoplastic elastomers may also be utilized to produce the outer cover layer as long as the non-ionomeric thermoplastic elastomers produce the playability and durability characteristics desired without adversely effecting the enhanced spin characteristics produced by the low acid ionomer resin compositions. These include, but are not limited to thermoplastic polyurethanes such as: Texin thermoplastic polyurethanes from Mobay Chemical Co. and the Pellethane thermoplastic polyurethanes from Dow Chemical Co.; Ionomer/rubber blends such as those in Spalding U.S. Pat. Nos. 4,986,545; 5,098,105 and 5,187,013; and, Hytrel polyester elastomers from DuPont and pebax polyesteramides from Elf Atochem S.A.

Similarly, a castable, thermosetting polyurethane produced by BASF under the trade designation Baytec® has also shown enhanced cover formulation properties. According to BASF, Baytec® (such as Baytec® RE 832), relates to a group of reactive elastomers having outstanding wear resistance, high mechanical strength, high elasticity and good resistance to weathering, moisture and chemicals. The Baytec® RE-832 system gives the following typical physical properties:

| Property | ASTM Test Method | Unit | Value |
| --- | --- | --- | --- |
| Tear Strength Die C | D624 | pli | 180 |
| Stress at | | | |
| 100% Modulus | D412 | psi | 320 |
| 200% Modulus | | | 460 |
| 300% Modulus | | | 600 |
| Ultimate Strength | D412 | psi | 900 |
| Elongation at Break | D412 | % | 490 |
| Taber Abrasion | D460, H-18 | mg/1000 cycles | 350 |

| Component[1] Properties | Part A (Isocyanate) | Part B (Resin) |
| --- | --- | --- |
| Viscosity @ 25° C., mPa · s | 2500 | 2100 |
| Density @ 25° C., g/cm | 1.08 | 1.09 |
| NCO, % | 9.80 | — |
| Hydroxyl Number, Mg KOH/g | — | 88 |

[1]Component A is a modified diphenylmethane diisocyanate (mDI) prepolymer and component B is a polyether polyol blend.

In preparing golf balls in accordance with the present invention, a hard inner cover layer is molded (by injection molding or by compression molding) about a core (preferably a solid core) A comparatively softer outer layer is molded over the inner layer.

The conventional solid core is about 1.545 inches in diameter, although it can range from about 1.495 to about 1.575 inches. Conventional solid cores are typically compression molded from a slug of uncured or lightly cured elastomer composition comprising a high cis content polybutadiene and a metal salt of an $\alpha$, $\beta$, ethylenically unsaturated carboxylic acid such as zinc mono or diacrylate or methacrylate. To achieve higher coefficients of restitution in the core, the manufacturer may include fillers such as small amounts of a metal oxide such as zinc oxide. In addition, larger amounts of metal oxide than those that are needed to achieve the desired coefficient are often included in conventional cores in order to increase the core weight so that the finished ball more closely approaches the U.S.G.A. upper weight limit of 1.620 ounces. Other materials may be used in the core composition including compatible rubbers or ionomers, and low molecular weight fatty acids such as stearic acid. Free radical initiators such as peroxides are admixed with the core composition so that on the application of heat and pressure, a complex curing cross-linking reaction takes place.

The inner cover layer which is molded over the core is about 0.100 inches to about 0.010 inches in thickness, preferably about 0.0375 inches thick. The outer cover layer is about 0.010 inches to about 0.050 inches in thickness, preferably 0.0300 inches thick. Together, the core, the inner cover layer and the outer cover layer combine to form a ball having a diameter of 1.680 inches or more, the minimum diameter permitted by the rules of the United States Golf Association and weighing about 1.620 ounces.

Additional materials may be added to the cover compositions (both inner and outer cover layer) of the present invention including dyes (for example, Ultramarine Blue sold by Whitaker, Clark and Daniels of South Plainsfield, N.J.) (see U.S. Pat. No. 4,679,795); pigments such as titanium dioxide, zinc oxide, barium sulfate and zinc sulfate; and UV absorbers; antioxidants; antistatic agents; and stabilizers. Further, the cover compositions of the present invention may also contain softening agents, such as plasticizers, processing aids, etc. and reinforcing material such as glass fibers and inorganic fillers, as long as the desired properties produced by the golf ball covers are not impaired.

The various cover composition layers of the present invention may be produced according to conventional melt blending procedures. In the case of the outer cover layer, when a blend of hard and soft, low acid ionomer resins are utilized, the hard ionomer resins are blended with the soft ionomeric resins and with a masterbatch containing the desired additives in a Banbury mixer, two-roll mill, or extruder prior to molding. The blended composition is then formed into slabs and maintained in such a state until molding is desired. Alternatively, a simple dry blend of the pelletized or granulated resins and color masterbatch may be prepared and fed directly into the injection molding machine where homogenization occurs in the mixing section of the barrel prior to injection into the mold. If necessary, further additives such as an inorganic filler, etc., may be added and uniformly mixed before initiation of the molding process. A similar process is utilized to formulate the low acid ionomer resin compositions used to produce the inner cover layer.

The golf balls of the present invention can be produced by molding processes currently well known in the golf ball art. Specifically, the golf balls can be produced by injection molding or compression molding the inner cover layer about wound or solid molded cores to produce an intermediate golf ball having a diameter of about 1.50 to 1.67 inches, preferably about 1.620 inches. The outer layer is subsequently molded over the inner layer to produce a golf ball having a diameter of 1.680 inches or more. Although either solid cores or wound cores can be used in the present invention, as a result of their lower cost and superior performance, solid molded cores are preferred over wound cores.

In compression molding, the inner cover composition is formed via injection at about 380° F. to about 450° F. into smooth surfaced hemispherical shells which are then positioned around the core in a mold having the desired inner cover thickness and subjected to compression molding at 200° to 300° F. for about 2 to 10 minutes, followed by cooling at 50° to 70° F. for about 2 to 7 minutes to fuse the shells together to form a unitary intermediate ball. In addition, the intermediate balls may be produced by injection molding wherein the inner cover layer is injected directly around the core placed at the center of an intermediate ball mold for a period of time in a mold temperature of from 50° F. to about 100° F. Subsequently, the outer cover layer is molded about the core and the inner layer by similar compression or injection molding techniques to form a dimpled golf ball of a diameter of 1.680 inches or more.

After molding, the golf balls produced may undergo various further processing steps such as buffing, painting and marking as disclosed in U.S. Pat. No. 4,911,451.

The resulting golf ball produced from the low acid ionomer resin inner layer and the relatively softer, low flexural modulus outer layer provide for an improved multi-layer golf ball which provides for desirable coefficient of restitution, compression, spin and durability properties while at the same time offering the feel characteristics associated with soft balata and balata-like covers of the prior art.

The present invention is further illustrated by the following examples in which the parts of the specific ingredients are by weight. It is to be understood that the present invention is not limited to the examples, and various changes and modifications may be made in the invention without departing from the spirit and scope thereof.

EXAMPLE 1

Several intermediate balls (cores plus inner cover layers) were prepared in accordance with conventional molding procedures described above. The inner cover compositions were molded around 1.545 inch diameter cores weighing 36.5 grams such that the inner cover had a wall thickness of about 0.0675 inches, with the overall ball measuring about 1.680 inches in diameter.

The cores utilized in the examples were comprised of the following ingredients: high cis-polybutadiene, zinc diacrylate, zinc oxide, zinc stearate, peroxide, calcium carbonate, etc. The molded cores exhibited Riehle compressions of about 60 and C.O.R. values of about 0.800. A representative formulation of the molded cores is set forth below:

| MATERIAL | WEIGHT |
| --- | --- |
| BR-1220 (high cis-polybutadiene) | 70.70 |
| Taktene 220 (high cis-polybutadiene) | 29.30 |
| React Rite ZDA (zinc diacrylate) | 31.14 |
| Zinc Oxide | 6.23 |
| Zinc Stearate | 20.15 |
| Limestone | 17.58 |
| Ground Flash (20–40 Mesh) | 20.15 |
| Blue Masterbatch | .012 |
| Luperco 231XL or Trigonox 29/40 | .89 |
| Papi 94 | .50 |

[1]Blue Masterbatch consists of unknown compositions used only for internal identification purposes and has no effect on physical properties.

The inner cover compositions designated herein as compositions A–E utilized to formulate the intermediate balls are set forth in Table 7 below. The resulting molded intermediate balls were tested to determine the individual compression (Riehle), C.O.R., Shore C hardness, spin rate and cut resistance properties. These results are also set forth in Table 7 below.

The data of these examples are the average of twelve intermediate balls produced for each example. The properties were measured according to the following parameters:

Coefficient of restitution (C.O.R.) was measured by firing the resulting golf ball in an air canon at a velocity of 125 feet per second against a steel plate positioned 12 feet from the muzzle of the canon. The rebound velocity was then measured. The rebound velocity was divided by the forward velocity to give a coefficient of restitution.

Shore hardness was measured in accordance with ASTM test 2240.

Cut resistance was measured in accordance with the following procedure: A golf ball is fired at 135 feet per second against the leading edge of a pitching wedge wherein the leading edge radius is 1/32 inch, the loft angle is 51 degrees, the sole radius is 2.5 inches and the bounce angle is 7 degrees.

The cut resistance of the balls tested herein was evaluated on a scale of 1 to 5. The number 1 represents a cut that extends completely through the cover to the core. A 2 represents a cut that does not extend completely through the cover but that does break the surface. A 3 does not break the surface of the cover but does leave a permanent dent. A 4 leaves only a slight crease which is permanent but not as severe as 3. A 5 represents virtually no visible indentation or damage of any sort.

The spin rate of the golf ball was measured by striking the resulting golf balls with a pitching wedge or 9 iron wherein the club head speed is about 105 feet per second and the ball is launched at an angle of 26 to 34 degrees with an initial velocity of about 110 to 115 feet per second. The spin rate was measured by observing the rotation of the ball in flight using stop action Strobe photography.

Initial velocity is the velocity of a ball when struck at a hammer speed of 143.8 feet per second in accordance with a test as prescribed by the U.S.G.A.

As will be noted, compositions A, B and C include high acid ionomeric resins (16% or more acid), with composition B further including zinc stearate. Composition D represents the inner layer (i.e. Surlyn 1605) used in U.S. Pat. No. 4,431,193. Composition E provides a hard, low acid ionomeric resin blend.

The purpose behind producing and testing the balls of Table 5 was to provide a subsequent comparison in properties with the multi-layer golf balls of the present invention.

TABLE 5

Molded Intermediate Golf Balls

|  | A | B | C | D | E |
|---|---|---|---|---|---|
| Ingredients of Inner Cover Compositions |  |  |  |  |  |
| Iotek 959 | 50 | 50 | — | — | — |
| Iotek 960 | 50 | 50 | — | — | — |
| Zinc Stearate | — | 50 | — | — | — |
| Surlyn 8162 | — | — | 75 | — | — |
| Surlyn 8422 | — | — | 25 | — | — |
| Surlyn 1605 | — | — | — | 100 | — |
| Iotek 7030 | — | — | — | — | 50 |
| Iotek 8000 | — | — | — | — | 50 |
| Properties of Molded Intermediate Balls |  |  |  |  |  |
| Compression | 58 | 58 | 60 | 63 | 62 |
| C.O.R. | .811 | .810 | .807 | .793 | .801 |
| Shore C Hardness | 98 | 98 | 97 | 96 | 96 |
| Spin Rate (R.P.M.) | 7,367 | 6,250 | 7,903 | 8,337 | 7,956 |
| Cut Resistance | 4–5 | 4–5 | 4–5 | 4–5 | 4–5 |

As shown in Table 5 above, the high acid ionomer resin inner cover layer (molded intermediate balls A–C) have lower spin rates and exhibit higher resiliency characteristics than the low acid ionomer resin based inner cover layers of balls D and E.

Multi-layer balls in accordance with the present invention were then prepared. Specifically, the inner cover compositions used to produce intermediate golf balls from Table 5 were molded over the solid cores to a thickness of about 0.0375 inches, thus forming the inner layer. The diameter of the solid core with the inner layer measured about 1.620 inches. Alternatively, the intermediate golf balls of Table 5 were ground down using a centerless grinding machine to a size of 1.620 inches in diameter to produce an inner cover layer of 0.0375 inches.

The size of 1.620 inches was determined after attempting to mold the outer cover layer to various sizes (1.600", 1.610", 1.620", 1.630" and 1.640") of intermediate (core plus inner layer) balls. It was determined that 1.620" was about the largest "intermediate" ball (i.e., core plus inner layer) which could be easily molded over with the soft outer layer materials of choice. The goal herein was to use as thin an outer layer as necessary to achieve the desired playability characteristics while minimizing the cost of the more expensive outer materials. However, with a larger diameter final golf ball and/or if the cover is compression molded, a thinner cover becomes feasible.

With the above in mind, an outer cover layer composition was blended together in accordance with conventional blending techniques. The outer layer composition used for this portion of the example is a relatively soft cover composition such as those listed in U.S. Pat. No. 5,120,791. An example of such a soft cover composition is a 45% soft/55% hard low acid ionomer blend designated by the inventor as "TE-90". The composition of TE-90 is set forth as follows:

| Outer Cover Layer Composition TE-90 | |
|---|---|
| Iotek 8000 | 22.7 weight % |
| Iotek 7030 | 22.7 weight % |
| Iotek 7520 | 45.0 weight % |
| White MB[1] | 9.6 weight % |

[1]White MB consists of about 23.77 weight percent $TiO_2$; 0.22 weight percent Uvitex OB, 0.03 weight percent Santonox R, 0.05 weight percent Ultramarine blue and 75.85 weight percent Iotek 7030.

The above outer layer composition was molded around each of the 1.620 diameter intermediate balls comprising a core plus one of compositions A–D, respectively. In addition, for comparison purposes, Surlyn® 1855 (new Surlyn® 9020), the cover composition of the '193 patent, was molded about the inner layer of composition D (the intermediate ball representative of the '193 patent). The outer layer TE-90 was molded to a thickness of approximately 0.030 inches to produce a golf ball of approximately 1.680 inches in diameter. The resulting balls (a dozen balls for each example) were tested and the various properties thereof are set forth in Table 6A as follows:

TABLE 6A

| | Finished Balls | | | | |
|---|---|---|---|---|---|
|  | 1 | 2 | 3 | 4 | 5 |
| Ingredients: |  |  |  |  |  |
| Inner Cover Composition | A | B | C | D | D |
| Outer Cover Composition | TE-90 | TE-90 | TE-90 | TE-90 | Surlyn ® 9020 |
| Properties of Molded Finished Balls: |  |  |  |  |  |
| Compression | 63 | 63 | 69 | 70 | 61 |
| C.O.R. | .784 | .778 | .780 | .770 | .757 |
| Shore C Hardness | 88 | 88 | 88 | 88 | 89 |
| Spin (R.P.M.) | 8,825 | 8,854 | 8,814 | 8,990 | 8,846 |
| Cut Resistance | 3–4 | 3–4 | 3–4 | 3–4 | 1–2 |

As it will be noted in finished balls 1–4, by creating a multi-layer cover utilizing the high acid ionomer resins in the inner cover layer and the hard/soft low acid ionomer resins in the outer cover layer, higher compression and increased spin rates are noted over the single layer covers of Table 5. In addition, both the C.O.R. and the Shore C hardness are reduced over the respective single layer covers of Table 5. This was once again particularly true with respect to the multi-layered balls containing the high acid ionomer resin in the inner layer (i.e. finished balls 1–4). In addition, with the exception of prior art ball 5 (i.e. the '193 patent), resistance to cutting remains good but is slightly decreased. As noted above, the prior art ball of the '193 patent suffers substantially in durability (as well as in resiliency) in comparison to the balls of the invention.

Furthermore, it is also noted that the use of the high acid ionomer resins as the inner cover material produces a substantial increase in the finished balls overall distance properties. In this regard, the high acid ionomer resin inner covers of balls 1–3 produce an increase of approximately 10 points in C.O.R. over the low acid ionomer resin inner covers of balls 4 and about a 25 point increase over the prior art balls 5. Since an increase in 3 to 6 points in C.O.R. results in an average increase of about 1 yard in distance, such an improvement is deemed to be significant.

Several other outer layer formulations were prepared and tested by molding them around the core and inner cover layer combination to form balls each having a diameter of about 1.68 inches. First, B.F.Goodrich Estane® X-4517 polyester polyurethane was molded about the core molded with inner layer cover formulation A. DuPont Surlyn® 9020 was molded about the core which was already molded with inner layer D. Similar properties tests were conducted on these golf balls and the results are set forth in Table 6B below:

TABLE 6B

| | Finish Balls | |
|---|---|---|
| | 6 | 7 |
| Ingredients: | | |
| Inner Cover Layer Composition | A | D |
| Outer Cover Layer Composition | Estane ® 4517 | Surlyn ® 9020 |
| Properties of Molded Finished Balls: | | |
| Compression | 67 | 61 |
| C.O.R. | .774 | .757 |
| Shore C Hardness | 74 | 89 |

TABLE 6B-continued

| | Finish Balls | |
|---|---|---|
| | 6 | 7 |
| Spin (R.P.M.) | 10,061 | 8,846 |
| Cut Resistance | 3–4 | 1–2 |

The ball comprising inner layer formulation D and Surlyn® 9020 identifies the ball in the Nesbitt U.S. Pat. No. 4,431,193. As is noted, the example provides for relatively high softness and spin rate though it suffers from poor cut resistance and low C.O.R. This ball is unacceptable by today's standards.

As for the Estane® X-4517 polyester polyurethane, a significant increase in spin rate over the TE-90 cover is noted along with an increased compression. However, the C.O.R. and Shore C values are reduced, while the cut resistance remains the same. Furthermore, both the Estane® X-4517 polyester polyurethane and the Surlyn® 9020 were relatively difficult to mold in such thin sections.

EXAMPLE 2

In order to analyze the change in characteristics produced by multi-layer golf balls (standard size) having inner cover layers comprised of ionomer resin blends of different acid levels, a series of experiments were run. Specifically, 14 tests were performed, varying the type of core, inner cover layer and outer cover layer. The results are shown below:

TABLE 7

| Sample # | CORE | INNER LAYER | THICKNESS | COMP/ COR | OUTER COVER | THICKNESS | COMP (Rhiele) | COR | SHORE D | SPIN |
|---|---|---|---|---|---|---|---|---|---|---|
| 8 | 1042 YELLOW | NONE | — | SEE BELOW | TOP GRADE | 0.055" | 61 | .800 | 68 | 7331 |
| 9 | 1042 YELLOW | NONE | — | SEE BELOW | 959/960 | 0.055" | 56 | .808 | 73 | 6516 |
| 10 | SPECIAL 1.47" | 959/960 | 0.050" | 65/.805 | 959/960 | 0.055" | 48 | .830 | 73 | 6258 |
| 11 | 1042 YELLOW | NONE | — | SEE BELOW | SD 90 | 0.055" | 62 | .792 | 63 | 8421 |
| 12 | SPECIAL 1.47" | TOP GRADE | 0.050" | 66/.799 | SD 90 | 0.055" | 55 | .811 | 63 | 8265 |
| 13 | SPECIAL 1.47" | 959/960 | 0.050" | 65/.805 | SD 90 | 0.055" | 53 | .813 | 63 | 8254 |
| 14 | SPECIAL 1.47" | TOP GRADE | 0.050" | 66/.799 | TOP GRADE | 0.055" | 51 | .819 | 68 | 7390 |
| 15 | 1042 YELLOW | NONE | — | SEE BELOW | Z-BALATA | 0.055" | 67 | .782 | 55 | 9479 |
| 16 | SPECIAL 1.47" | 959/960 | 0.050" | 65/.805 | Z-BALATA | 0.055" | 61 | .800 | 55 | 9026 |
| 17 | SPECIAL 1.47" | TOP GRADE | 0.050" | 66/.799 | Z-BALATA | 0.055" | 60 | .798 | 55 | 9262 |

1042 YELLOW > COMP = 72, COR = .780
SPECIAL 1.47" CORE >COMP = 67, COR = .782

In this regard, "Top Grade" or "TG" is a low acid inner cover ionomer resin blend comprising of 70.6% Iotek 8000, 19.9% Iotek 7010 and 9.6% white masterbatch. "959/960" is a 50/50 wt/wt blend of Iotek 959/960. In this regard, Escor® or Iotek 959 is a sodium ion neutralized ethylene-acrylic neutralized ethylene-acrylic acid copolymer. According to Exxon, Ioteks 959 and 960 contain from about 19.0 to about 21.0% by weight acrylic acid with approximately 30 to about 70 percent of the acid groups neutralized with sodium and zinc ions, respectively. The physical properties of these high acid acrylic acid based ionomers are as follows:

| PROPERTY | ESCOR ® (IOTEK) 959 | ESCOR ® (IOTEK) 960 |
|---|---|---|
| Melt Index g/10 min | 2.0 | 1.8 |

-continued

| PROPERTY | ESCOR ® (IOTEK) 959 | ESCOR ® (IOTEK) 960 |
| --- | --- | --- |
| Cation | Sodium | Zinc |
| Melting Point, ° F. | 172 | 174 |
| Vicat Softening Point, ° F. | 130 | 131 |
| Tensile @ Break, psi | 4600 | 3500 |
| Elongation @ Break, % | 325 | 430 |
| Hardness, Shore D | 66 | 57 |
| Flexural Modulus, psi | 66,000 | 27,000 |

Furthermore, the low acid ionomer formulation for "SD 90" and "Z-Balata" are set forth below:

| SD Cover | ZB Cover |
| --- | --- |
| 17.2% Surlyn 8320 | 19% Iotek 8000 |
| 7.5% Surlyn 8120 | 19% Iotek 7030 |
| 49% Surlyn 9910 | 52.5% Iotek 7520 |
| 16.4% Surlyn 8940 | 9.5% white MB |
| 9.7% white MB | |

The data clearly indicates that higher C.O.R. and hence increase travel distance can be obtained by using multi-layered covered balls versus balls covered with single layers. However, some sacrifices in compression and spin are also noted. Further, as shown in comparing Example Nos. 12 vs. 13, Example Nos. 17 vs. 16, etc., use of lower acid level inner cover layers and relatively soft outer cover layers (i.e., 50 wt. % or more soft ionomer) produces softer compression and higher spin rates than the golf balls comprised of high acid inner cover layers. Consequently, use of blends of low acid ionomer resins to produce the inner layer of a multi-layer covered golf ball, produces not only enhanced travel distance but also enhanced compression and spin properties.

EXAMPLE 3

Multi-layer oversized golf balls were produced utilizing different ionomer resin blends as the inner cover layer (i.e., core plus inner cover layer is defined as "mantel"). The "ball data" of the oversized multi-layer golf balls in comparison with production samples of "Top-Flite® XL" and "Top-Flite® Z-Balata" is set forth below.

TABLE 8

| | 18 | 19 | 20 | 21 Top-Flite ® XL | 22 Top-Flite ® Z-Balata 90 |
| --- | --- | --- | --- | --- | --- |
| Core Data | | | | | |
| Size | 1.43 | 1.43 | 1.43 | 1.545 | 1.545 |
| COR | .787 | .787 | .787 | — | — |
| Mantel Data | | | | | |
| Material | TG | TG | TG | — | — |
| Size | .161 | 1.61 | 1.61 | — | — |

TABLE 8-continued

| | 18 | 19 | 20 | 21 Top-Flite ® XL | 22 Top-Flite ® Z-Balata 90 |
| --- | --- | --- | --- | --- | --- |
| Thickness | .090 | .090 | .090 | — | — |
| Shore D | 68 | 68 | 68 | — | — |
| Compression | 57 | 57 | 57 | — | — |
| COR | .815 | .815 | .815 | — | — |
| Ball Data | | | | | |
| Cover | TG | ZB | SD | TG | ZB |
| Size | 1.725 | 1.723 | 1.726 | 1.681 | 1.683 |
| Weight | 45.2 | 45.1 | 45.2 | 45.3 | 45.5 |
| Shore D | 68 | 56 | 63 | 68 | 56 |
| Compression | 45 | 55 | 49 | 53 | 77 |
| COR | .820 | .800 | .810 | .809 | .797 |
| Spin | 7230 | 9268 | 8397 | 7133 | 9287 |

The results indicate that use of multi-layer covers enhances C.O.R. and travel distance. Further, the data shows that use of a blend of low acid ionomer resins (i.e., "Top Grade") to form the inner cover layer in combination with a soft outer cover ("ZB" or "SD") produces enhanced spin and compression characteristics. The overall combination results in a relatively optimal golf ball with respect to characteristics of travel distances, spin and durability.

EXAMPLE 4

Castable Polyurethane Covered Multi-layer Balls

A limited number of samples were made using BASF Baytec® RE232 polyurethane as a cover material over four different types of mantle cores. Controls included Z-Balata 100s along with the same mantle cores used for the polyurethane samples covered with Z-Balata cover stock. Mantle cores were made up of 82 and 58 compression cores covered with Iotek 8030/7030.

Castable PU Molding Process

Materials used:
  Baytec® RE832, mix ratio 9 parts A/12 parts B
  1—1.57" i.d. smooth cavity
  2—1.68" i.d. dimpled cavities
  1—2" hose clamp
  1—bench vise or large C-clamp
(The smooth and dimpled cavities are the same O.D.)

The mantle core is 1.57" and fits snugly in the 1.57" cavity. The hose clamp is attached to the 1.57" cavity and a mantle core is placed in inside. Urethane is mixed and poured into one of the dimpled cavities and the two halves are placed together and clamped, forcing out excess material and forming half the cover. The hose clamp is used to keep the two mold halves aligned during curing. When the cover material is set up enough (about 5 minutes), the two halves are separated and the 1.57" mold is replaced with the other 1.68" mold and the process is repeated. Both halves of the cover are now cast and the entire assemble is placed in an 125 F. oven for 1 hour after which it can be opened and the ball removed.

All samples were finished using normal production equipment and procedures. The properties of the finished balls are set forth below:

TABLE 9

|  | 23 | 23 | 24 | 25 | 26 | 27 | 28 | 29 |
|---|---|---|---|---|---|---|---|---|
| CORE DATA | | | | | | | | |
| Size | 1.47" | 1.47" | 1.47" | 1.47" | 1.47" | 1.47" | 1.47" | 1.47" |
| Weight | 32.2 | 32 | 32.2 | 32 | 37.7 | 32.2 | 32 | 32.2 |
| Comp | 82 | 58 | 82 | 58 | 85 | 82 | 58 | 82 |
| COR | 768 | 772 | 768 | 772 | 794 | 768 | 772 | 768 |
| MANTLE DATA | | | | | | | | |
| Material | Iotek 8030/7030 | Iotek 8030/7030 | Iotek 8030/7030 | Iotek 8030/7030 | None | Iotek 8030/7030 | Iotek 8030/7030 | Iotek 8030/7030 |
| Weight | 37.8 | 38.1 | 37.9 | 38.1 | | 37.8 | 38.1 | 37.9 |
| Size | 1.58" | 1.57" | 1.57" | 1.57" | | 1.57" | 1.57" | 1.57" |
| Comp | 70 | 48 | 69 | 48 | | 70 | 48 | 69 |
| COR | 781 | 785 | 786 | 788 | | 781 | 785 | 786 |
| BALL DATA | | | | | | | | |
| Cover Material | Baytec RE832 | Baytec RE832 | Baytec RE832 | Baytec RE832 | Z-Balata | Z-Balata | Z-Balata | Z-Balata |
| Weight | 45.4 | 45.5 | 45.5 | 45.2 | 45.3 | 44.8 | 45 | |
| Comp | 75 | 64 | 73 | 60 | 80 | 66 | 50 | 65 |
| COR | 771 | 763 | 770 | 761 | 792 | 775 | 774 | 778 |
| Shore C | 65 | 65 | 65 | 65 | 84 | 84 | 84 | 84 |
| Spin (rpm) | 9560 | 8789 | 9285 | 8760 | 8796 | 8702 | 9072 | 8643 |
| Cut (1-good, 4-poor) | 2 | 2 | 2 | 1.5 | 2 | 2 | 2 | 2 |
| Scuff (1-good, 4-poor) | 1.5 | 1.5 | 1.5 | 1.5 | 2 | 3 | 3 | 3 |

Table 9 contains the construction details and test results. Multilayer balls with the thermoset urethane covers (Examples 23–25) were softer in compression and similar in COR to the multi-layer balls with the Z-Balata cover (Examples 27–29) shore C was much lower for the urethane balls and they were more resistant to scuff than any of the Z-Balata covered balls. Guillotine cut resistance was about the same. Spin rate comparison shows that the urethane samples are better than the Z-Balata covered balls.

Test results indicate that a very good multi-layer ball can be made using castable polyurethane cover material. Further, advantages include the molding very thin covers, molding over very soft compression core/mantle, and low cost tooling.

The invention has been described with reference to the preferred embodiment. Obviously, modifications and alterations will occur to others upon reading and understanding the proceeding detailed description. It is intended that the invention be construed as including all such modifications and alterations insofar as they come within the scope of the appended claims or the equivalents thereof.

I claim:

1. A golf ball comprising:
   a core;
   an inner cover layer having a Shore D hardness of 60 or more molded on said core, said inner cover layer having a thickness of 0.100 to 0.010 inches, said inner cover layer comprising a blend of two or more low acid ionomer resins containing no more than 16% by weight of an alpha, beta-unsaturated carboxylic acid; and
   an outer cover layer having a Shore D hardness of 64 or less molded on said inner cover layer, said outer cover layer having a thickness of 0.010 to 0.070 inches, and said outer cover layer comprising a relatively soft polyurethane material.

2. The golf ball according to claim 1, wherein said golf ball has an overall diameter of 1.680 inches or more.

3. The golf ball according to claim 1, wherein said inner cover layer has a thickness of about 0.050 inches, said outer cover layer has a thickness of about 0.055 inches, and said golf ball has an overall diameter of 1.680 inches or more.

4. A multi-layer golf ball comprising:
   a spherical core;
   an inner cover layer having Shore D hardness of about 60 or more molded over said spherical core, said inner cover layer comprising an ionomeric resin including no more than 16% by weight of an alpha, beta-unsaturated carboxylic acid and having a modulus of from about 15,000 to about 70,000 psi; and
   an outer cover layer having a Shore D hardness of about 64 or less disposed about said inner cover layer and defining a plurality of dimples to form a multi-layer golf ball, said outer cover layer comprising polyurethane based material.

5. A golf ball according to claim 4, wherein said inner cover layer has a thickness of about 0.100 to about 0.010 inches and said outer cover layer has a thickness of about 0.010 to about 0.070 inches, said golf ball having an overall diameter of 1.680 inches or more.

6. A golf ball according to claim 4 wherein said inner cover layer has a thickness of about 0.050 inches and said outer cover layer has a thickness of about 0.055 inches, said golf ball having an overall diameter of 1.680 inches or more.

7. A multi-layer golf ball comprising:
   a spherical core;
   an inner cover layer molded over said spherical core to form a spherical intermediate ball, said inner cover layer having a Shore D hardness of at least 60, said inner cover layer comprising an ionomeric resin having no more than 16% by weight of an alpha, beta-unsaturated carboxylic acid and having a modulus of from about 15,000 to about 70,000 psi; and
   a dimpled outer cover layer molded over said spherical intermediate ball to form a multi-layer golf ball, said outer cover having a Shore D hardness of 64 or less, said outer layer comprising a polyurethane, said outer cover layer having a modulus in a range of about 1,000 to about 30,000 psi.

8. The multi-layer golf ball of claim 7 wherein the Shore D hardness of said outer cover layer is less than the Shore D hardness of said inner cover layer.

* * * * *

(12) INTER PARTES REEXAMINATION CERTIFICATE (0419th)
United States Patent
Sullivan

(10) Number: US 6,210,293 C1
(45) Certificate Issued: *Aug. 14, 2012

(54) MULTI-LAYER GOLF BALL

(75) Inventor: Michael J. Sullivan, Chicopee, MA (US)

(73) Assignee: Callaway Golf Company, Carlsbad, CA (US)

Reexamination Request:
No. 95/000,120, Jan. 17, 2006

Reexamination Certificate for:
Patent No.: 6,210,293
Issued: Apr. 3, 2001
Appl. No.: 09/470,196
Filed: Dec. 21, 1999

( * ) Notice: This patent is subject to a terminal disclaimer.

Related U.S. Application Data

(63) Continuation of application No. 08/870,585, filed on Jun. 6, 1997, now abandoned, which is a continuation of application No. 08/556,237, filed on Nov. 9, 1995, now abandoned, which is a continuation-in-part of application No. 08/070,510, filed on Jun. 1, 1993, now abandoned.

(51) Int. Cl.
*A63B 37/00* (2006.01)

(52) U.S. Cl. .......................................................... 473/374
(58) Field of Classification Search .......................... None
See application file for complete search history.

(56) References Cited

To view the complete listing of prior art documents cited during the proceeding for Reexamination Control Number 95/000,120, please refer to the USPTO's public Patent Application Information Retrieval (PAIR) system under the Display References tab.

*Primary Examiner*—Jeffrey L. Gellner

(57) ABSTRACT

The present invention is directed to an improved multi-layer golf ball comprising a core, an inner cover layer and an outer cover layer. The inner cover layer is comprised of a low acid ionomer blend which may or may not include a filler such as zinc-stearate. The outer cover layer is comprised of a soft, non-ionomeric thermoplastic or thermosetting elastomer such as polyurethane, polyester or polyesteramide. The resulting multi-layered golf ball of the present invention provides for enhanced distance without sacrificing playability or durability when compared to known multi-layer golf balls.

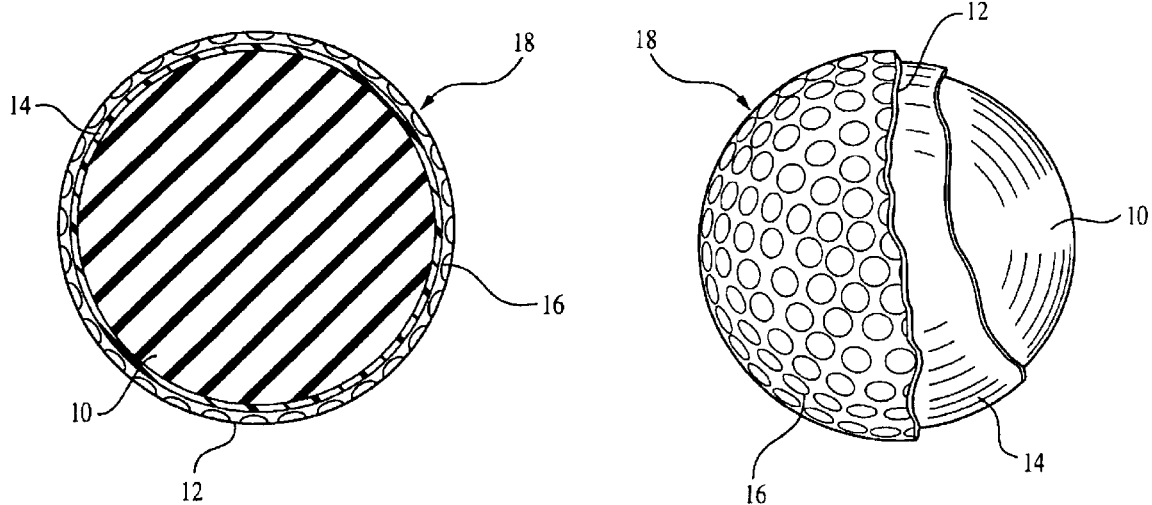

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-8 are cancelled.

* * * * *